US010776379B1

(12) United States Patent
Coffin et al.

(10) Patent No.: US 10,776,379 B1
(45) Date of Patent: Sep. 15, 2020

(54) SMART DOCUMENTATION SYSTEMS AND METHODS

(71) Applicant: UIPCO, LLC, San Antonio, TX (US)

(72) Inventors: Timothy Luke Coffin, San Antonio, TX (US); Ronald Maurice John Hoch, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 365 days.

(21) Appl. No.: 15/918,058

(22) Filed: Mar. 12, 2018

Related U.S. Application Data

(60) Provisional application No. 62/476,432, filed on Mar. 24, 2017.

(51) Int. Cl.
  *G06F 16/00* (2019.01)
  *G06F 16/25* (2019.01)
  *G06F 3/0482* (2013.01)
  *G06F 16/248* (2019.01)
(52) U.S. Cl.
  CPC .......... *G06F 16/252* (2019.01); *G06F 3/0482* (2013.01); *G06F 16/248* (2019.01)

(58) Field of Classification Search
  CPC ..... G06F 16/252; G06F 16/248; G06F 3/0482
  See application file for complete search history.

(56) References Cited

U.S. PATENT DOCUMENTS

| 7,095,426 | B1 * | 8/2006 | Childress | G06Q 10/087 |
| | | | | 715/708 |
| 2010/0293004 | A1 * | 11/2010 | Nye | G06Q 50/22 |
| | | | | 705/2 |

* cited by examiner

*Primary Examiner* — Jared M Bibbee
(74) *Attorney, Agent, or Firm* — Perkins Coie LLP

(57) ABSTRACT

Methods and systems described herein can provide a computing device configured to display on a display screen of the computing device a first window listing a set of entries and a second window that can add entries directly into the set of entries and that can search for entries having selected features. The second window can dynamically display one or more keywords related to an entry as the entry is being created. The keywords can be determined as the entry is created and can be associated with the entry as the entry is added to the set of entries. The second window can receive a search request with the keywords and in response, cause the entries associated with the keywords to be displayed in the first window.

20 Claims, 9 Drawing Sheets

FIG. 5

| NAMED INSURED | USAA# | LOSS# | DATE OF LOSS | | LOSS ACTIONS ˅ |
|---|---|---|---|---|---|
| | | 005 | 06/14/2016 | | X |

| Claims Documentation | Expand All | Collapse All | ˄ |
|---|---|

1 · Thu, Jun 30, 2016 – 4:10 PM CT - ✉ Lisa Saleh (B4767)  ˄

Loss Report Created

2 · Thu, Jun 30, 2016 – 4:11 PM CT - ✉ Lisa Saleh (B4767)  ˄

Loss Details
Statement has been entered for CD ATTY OFFICE (Reporting person) on 6/1/2016 at 04:43 PM

3 · Thu, Jun 30, 2016 – 4:18 PM CT - ✉ Lisa Saleh (B4767)  ˄

Conversation record New to Old
OLD UNIT=3658, OLD CM=41
NEW UNIT=3637, NEW CM=XX

4 · Thu, Jun 30, 2016 – 4:18 PM CT - ✉ System (99999)  ˄

Claims Auto Automated Initial
Status: Submitted
Address:
Delivery Option: Email
Channel Info: email@yahoo.com

5 · Thu, Jun 30, 2016 – 4:19 PM CT - ✉ Lisa Saleh (B4767)  ˄

Investigative report Request
Police Report = IDAHO STATE POLICE

Tools & Settings

| Add | Search | Settings |
|---|---|---|

Your Preferences

These preferences will be saved and applied any time you are reviewing Claims Documentation Sort Order

| Newest to Oldest | Oldest to Newest |
|---|---|

Default Tab

| Add | Search |
|---|---|

FIG. 6

| Source Table Definition | Source Table Columns | Source Table Roles | Source Table Policy | Source Table Views | Source Table Data | Source Table Change ID |
|---|---|---|---|---|---|---|

Promotion Level: ☒TEST ☒PROD
Pending CIDs: No CID Selected ▼
Column Selection : [ All ] [ User ] [ Custom/Options ]

| Status | DocFilterCd* (Text) | DocFilterSeqNr* (Number) | Releaseid (Text) | SoftDelete (Text) | DocFilterDesc (Text) | DocFilterLongDesc (Text) |
|---|---|---|---|---|---|---|
| DB Filter -> | | | | | | |
| ☒ PRD ☐ | ABI | 001 | 20160122001001 | N | ABI | ABI Document Solution Services |
| ☒ PRD ☐ | ADDITIONALLIVINGEXPENSE | 001 | 20160122001001 | N | ALE | additional living expense |
| ☒ PRD ☐ | ADVERSECARRIER | 001 | 20160122001001 | N | AC | adverse carrier, ac, oic |
| ☒ PRD ☐ | AFFIDAVITOFNOINSURANCE | 001 | 20160122001001 | N | AONI | Affidavit of no insurance |
| PRD ☐ | AIRBAG | 001 | 20160122001001 | N | Airbag | Airbag |
| PRD ☐ | ALERTS | 001 | 20160122001001 | N | Alerts | npc, prior, covg issue |
| PRD ☐ | ARBITRATION | 001 | 20160122001001 | N | Arb | Arbitration |
| ☒ PRD ☐ | ATTORNEY | 001 | 20160122001001 | N | Attorney | att, arry, atny, attny, lawyer |
| ☒ PRD ☐ | AUTHORITY | 001 | 20160122001001 | N | Authority | auth, autho, rfa, reserve |
| ☒ PRD ☐ | AUTOINJURYSOLUTIONS | 001 | 20160122001001 | N | AIS | Auto Injury Solutions, fpi, first party, 1st pty |
| PRD ☐ | CLAIMANTDRIVER | 001 | 20160122001001 | N | AD1 | Claimant driver one |
| PRD ☐ | CLAIMANTDRIVERFOUR | 001 | 20160122001001 | N | CD4 | Claimant driver four |
| PRD ☐ | CLAIMANTOWNERTHREE | 001 | 20160122001001 | N | CLOVV3 | Claimant owner three |
| PRD ☐ | CLAIMANTOWNERTWO | 001 | 20160122001001 | N | CLOVV2 | Claimant owner two |
| PRD ☐ | CLAIMANTPASSENGER | 001 | 20160122001001 | N | CP1 | Claimant passenger one |
| PRD ☐ | CLAIMANTPASSENGERFOUR | 001 | 20160122001001 | N | CP4 | Claimant passenger four |
| PRD ☐ | CLAIMANTPASSENGERTHREE | 001 | 20160122001001 | N | CP3 | Claimant passenger three |
| PRD ☐ | CLAIMANTPASSENGERTWO | 001 | 20160122001001 | N | CP2 | Claimant passenger two |
| PRD ☐ | CLAIMANTVEHICLE | 001 | 20160122001001 | N | CV1 | Claimant vehicle one |
| PRD ☐ | CLAIMANTVEHICLEFOUR | 001 | 20160122001001 | N | CV4 | Claimant vehicle four |
| PRD ☐ | CLAIMANTVEHICLETHREE | 001 | 20160122001001 | N | CV3 | Claimant vehicle three |
| PRD ☐ | CLAIMANTVEHICLETWO | 001 | 20160122001001 | N | CV2 | Claimant vehicle two |
| PRD ☐ | CONTACT | 001 | 20160122001001 | N | Contact | ibc, obc, ctc, call |
| ☒ PRD ☐ | CORRESPONDENCE | 001 | 20160122001001 | N | Correspondence | letter, pings, emails, faxes |
| ☒ PRD ☐ | COVERAGE | 001 | 20160122001001 | N | Coverage | covg, cvg, exposure, bi, umpd, coll, comp |
| ☒ PRD ☐ | DEDUCTIBLE | 001 | 20160122001001 | N | Deductible | ded, waiver, wvr |
| PRD ☐ | DEMAND | 001 | 20160122001001 | N | Demand | dmnd, time limit, tld |
| PRD ☐ | DEPARTMENTOFINSURANCE | 001 | 20160122001001 | N | DOI | Department of Insurance |
| ☒ PRD ☐ | DEPRECIATION | 001 | 20160122001001 | N | Depreciation | r d, recoverable |
| PRD ☐ | DIMINUTIONINVALUE | 001 | 20160122001001 | N | DIV | Diminution in value |
| PRD ☐ | EDOC | 001 | 20160122001001 | N | eDoc | Electronic Document |
| ☒ PRD ☐ | ESCALATION | 001 | 20160122001001 | N | Escalation | complaint, escalation |
| ☒ PRD ☐ | ESTIMATE | 001 | 20160122001001 | N | Estimate | est, MOI, IA, DRP, PDRP, IVAP, CVAP, supp. |
| ☒ PRD ☐ | EXECUTOR | 001 | 20160122001001 | N | Exeuctor | will, state, trustee |
| ☒ PRD ☐ | EXTERIORSIDING | 001 | 20160122001001 | N | Exterior Siding | siding, brick, quitter, window |

FIG. 7A

| DocFilterType (Text) | LineOfBusiness (Text) | DocFilterKeywords (Text) |
|---|---|---|
| | | Source Table [ ] Search [ ] |
| TOPIC | ALL | b&r;b/r;br;abi; |
| TOPIC | PROPERTY | additional living expense;ale;additional living expenses;addtl living expense;addtl living expenses;hotel;unlivable;food;receipts; |
| ENTITY | ALL | a/ca;c1;a/c2;a/c3;ac1;ac2;ac3;adverse;carrier;geico;amica;progressive;state farm;nationwide;allstate;liberty mutual;farmers;dru;bri; |
| TOPIC | ALL | affidavit of no insurance;aoni; |
| TOPIC | ALL | air-bag;air bag;airbag;airbags; |
| TOPIC | ALL | similar losses;policy inception;reserves exceed;limit;limits;coverage question;covg issue;covg question;corporate active d |
| ENTITY | ALL | arbitration;arb;arbitor; |
| ENTITY | ALL | attorney;attorney;atty;athy;atny;lawyer;lawsuit;court;att;acknowledgement; |
| TOPIC | ALL | reserve;reserves;rfa;auth;authority;autho; |
| TOPIC | ALL | ais;auto injury solutions;fpi;first party injury;1st pty;first pty; |
| ENTITY | ALL | cd/rs;cd/stmt;cd/clow;clow/cd;cdrs;cd rs;claimant driver;claimant drvr;clmtdrvr;clmt drvr;cv driver;cv1 driver;cd1;cdsmtm;cd1; |
| ENTITY | ALL | cd4/rs;cd/rs4;cd4/stmt;cd4/clow;clow/cd4;cdrs4;cd4 rs;cd4rs;claimant driver 4;claimant drvr4;clmtdrvr4;clmt drvr4;clmt dri |
| ENTITY | ALL | c/o3;c/o 3;clow 3;clow3;claimant owner 3; |
| ENTITY | ALL | c/02;c/0 2;clow 2;clow2;claimant owner 2; |
| ENTITY | ALL | c/p;c/p1;cp/1;cp1;cp;claimant passenger; clmt pass; clow passenger;clow pass;cvpass; |
| ENTITY | ALL | cp4;cp;cp/4;cp4;claimant passenger4;claimant passenger 4;clmt pass4;clmt pass 4;clow passenger 4;clow pass 4;cvpass4;cv pa |
| ENTITY | ALL | cp3;cp/3;cp3;claimant passenger3;claimant passenger 3;clmt pass3;clmt pass 3;clow passenger 3;clow pass 3;cvpass3;cv pa |
| ENTITY | ALL | cp2;cp/3;cp2;claimant passenger2;claimant passenger 2;clmt pass2;clmt pass 2;clow passenger 2;clow pass 2;cvpass2;cv pa |
| ENTITY | ALL | c/v1;cv1;claimant vehicle;claimant veh;clmt vehicle; clmt veh;cv; |
| ENTITY | ALL | c/v4;cv4;veh4;veh 4; |
| ENTITY | ALL | c/v3;cv3;veh3;veh 3; |
| ENTITY | ALL | c/v2;cv2;veh2;veh 2; |
| TOPIC | ALL | ilb;b/t/r;cr/cp/c;contact;ctc;call;called;ibc;obc;cnct; |
| TOPIC | ALL | c-c0m;c-comm;e-mail;e-mailing;emailing;correspondence;letter;email;message;claims wall;ccom;comm;mail;ping;png;fax;post; |
| TOPIC | ALL | umpd/uimpd;cvg;cov;covg;coverage;coverages;expo;exposure;coll;comp;umpd;um;umbi;med pay;medpay;mp;pip;personal injury protecti |
| TOPIC | ALL | deductible;ded;waiver;waived;waive;wvr; |
| TOPIC | ALL | time limit;dmnd;demand;tld; |
| TOPIC | ALL | doi;department of insurance;dept of ins; |
| TOPIC | PROPERTY | r-d;r d;recoverable;nonrecoverable;rd;r/d;depreciation; |
| TOPIC | VEHICLE | div;diminution;loss of value;loss in value; |
| TOPIC | ALL | e doc;e-doc's;e-doc;edoc;edocs; |
| TOPIC | ALL | escalation;complaint; |
| TOPIC | ALL | est/ert;ivap;cvap;ccvap1;ccvap2;ccvap3;cvap1;cvap2;cvap3;cvap4;jv est;cv est;cv1 est;cv2 est;cv3 est;cv4 est;estimate;appra |
| TOPIC | ALL | executor;executors;will;estate;trustee;trustees |
| TOPIC | PROPERTY | siding;brick;bricks;hardy board;window;windows;glaze;gutter;gutters;guttering;downspot;downspouts; |

FIG. 7B

SMART DOCUMENTATION SYSTEMS AND METHODS

CROSS-REFERENCE TO RELATED APPLICATIONS

This application is a non-provisional of and claims priority U.S. Provisional Application No. 62/476,432, filed on Mar. 24, 2017, entitled "SMART DOCUMENTATION SYSTEM AND METHOD," which is hereby incorporated by reference in its entirety for all purposes.

TECHNICAL FIELD

Various embodiments of the present disclosure generally relate to documentation. More specifically, various embodiments of the present disclosure relate to smart documentation systems and methods.

BRIEF DESCRIPTION OF THE DRAWINGS

Embodiments of the present disclosure will be described and explained through the use of the accompanying drawings, in which:

FIG. 5 is an example of a user interface that allows a user to search entries in accordance with various embodiments of the present disclosure;

FIG. 6 is an example of a user interface that allows a user to select user settings in accordance with various embodiments of the present disclosure;

FIGS. 7A-7B are an example of how a smart documentation can be organized in accordance with various embodiments of the present disclosure;

DETAILED DESCRIPTION

Figure 1:
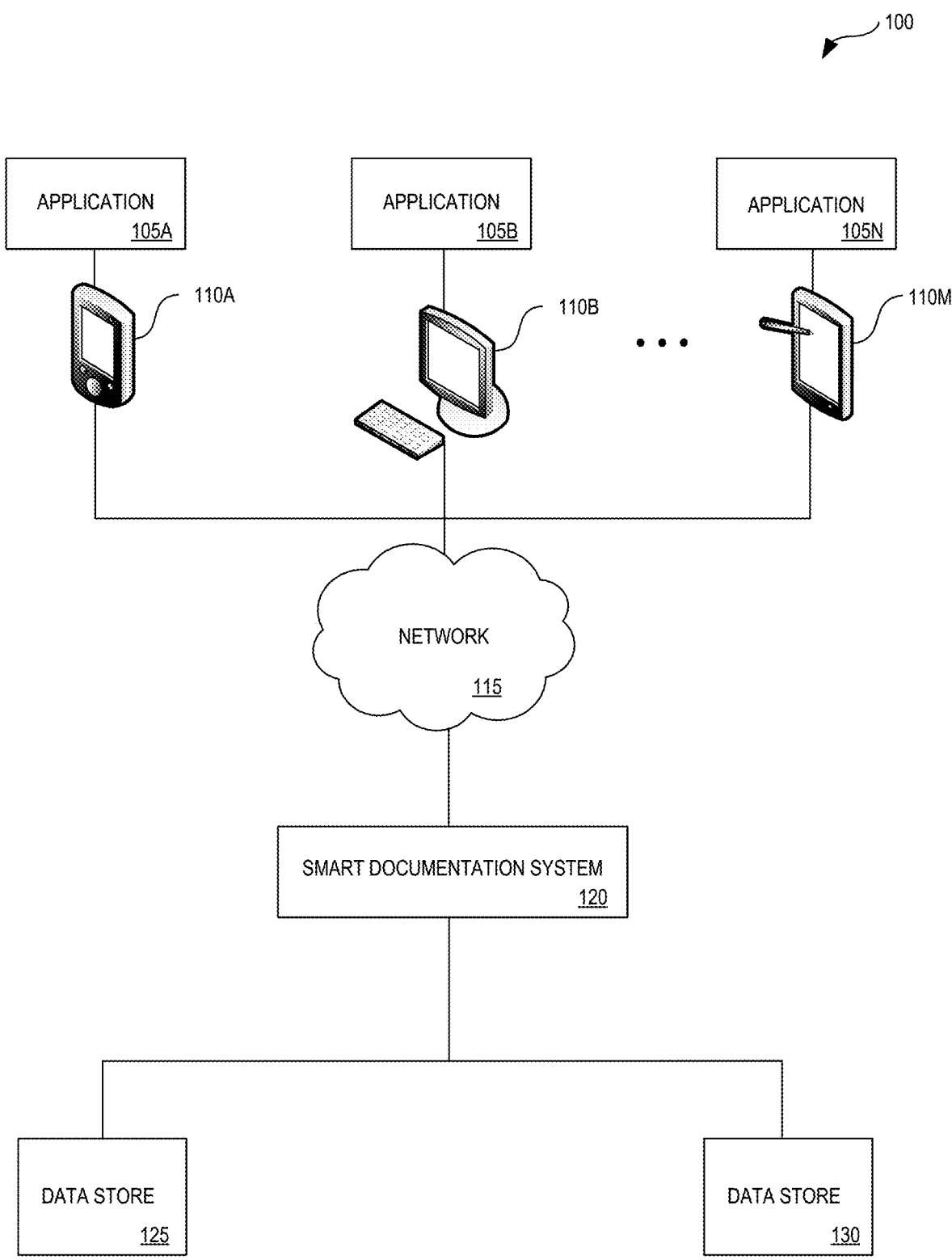
FIG. 1 illustrates an example of a network-based operating environment in accordance with various embodiments of the present disclosure.

Existing documentation systems can provide limited sorting options and inefficient view options. When dealing with thousands of documents for one matter, such as when a person submits a medical, home, or auto insurance claim, time, accuracy and overall user satisfaction is compromised. For example, previous claims documentation systems display entries on an entirely different screen than adding or searching entries. Additionally, in the prior systems, all entries are treated the same regardless of whether the system or a representative generated the entry. When searching for an entry in the prior systems, the search terms must match precisely or an entry will not be included in the search results. Prior systems include templates that help generate entries. However, many times the templates are not completely filled out and yet even the incomplete fields (e.g., labels) are saved, taking up memory but not providing information. Methods and systems described herein use a smart documentation system, allowing users to view, add, and search entries efficiently.

In some embodiments, the system can arrange a graphical user interface to have a first portion (e.g., window) with a set of entries and a second portion (e.g., window) with the capability to create and add an entry to the set of entries and search within entries. As the user creates and entry, the system can determine keywords/topics that will trigger the entry when the set of entries are being searched. The keywords can be associated with the entry when the entry is added to the set of entries. When a user searches the set of entries, the user can select filters including keywords, entities, types of entry (e.g., system created, manually created), types of documentation (e.g., photograph, phone call documentation, electronic documentation), and others. The entries triggered by the search parameters, including the keyword can be displayed on the first portion of the graphical user interface. In some embodiments, the smart documentation system is viewed from variable screen sizes. The first and the second portions are sized so the user can operate even on smaller screens. In some embodiments, where entries are created from templates, only the completed portions of the templates are saved.

The system defaults can allow for certain types of entries to be automatically collapsed while other entries are automatically expanded, though defaults can change with user preferences. In some embodiments, entries associated with more than one or all of the search criteria are shown in an expanded view whereas entries associated with only one of the search criteria are shown in a collapsed view.

In some embodiments, the system is a claims documentation system. In an example, adding an entry can include adding notes from a conversation with the claimant or noting that the author has completed paperwork on the claim. Entries can also be system generated. For example, the system can generate an entry that notates that a letter was sent to the claimant. In some embodiments, the set of entries relates only to a single claim. In other embodiments, the set of entries relates to multiple claims made by a particular claimant.

This disclosure describes smart documentation systems and methods designed to increase the efficiency of using a system with multiple entries. Various embodiments may provide one or more of the following technological improvements: (1) improved accuracy in searching for entries; (2) increased efficiency in adding entries; (3) real-time or near real-time knowledge of searches that will trigger an entry; and (4) memory savings by saving only completed portions of entries created with templates.

In this description, numerous specific details are set forth to provide a thorough understanding of embodiments of the present disclosure. However, it will be apparent to one skilled in the art upon reading the disclosure that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, read-only memories (ROMs), random-access memories (RAMs), erasable programmable read-only memories (EPROMs), electrically erasable programmable read-only memories (EEPROMs), magnetic or optical cards, flash memory, or other types of machine-readable media suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to smart documentation system 120, and data stores 125 and 130.

Computing devices 110A-110M may be configured to communicate via network 115 with smart documentation system 120. In some embodiments, computing devices 110A-110M can retrieve or submit information to smart documentation system 120 and run one or more applications with customized content retrieved by smart documentation system 120, and data stores 125 and 130. For example, computing devices 110A-110M can execute a browser application or a customized client to enable interaction between the computing devices 110A-110M, smart documentation system 120, and data stores 125 and 130.

Network 115 can be any combination of local area and/or wide area networks using wired and/or wireless communication systems. Network 115 can be or could use any one or more of the following protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), user datagram protocol (UDP), hypertext transport protocol (HTTP), simple mail transfer protocol (SMTP), and file transfer protocol (FTP). Data exchanged over network 115 may be represented using technologies, languages, and/or formats including hypertext markup language (HTML), or extensible markup language (XML). In addition, all or some links can be encrypted using conventional encryption technologies such as secure sockets layer (SSL), transport layer security (TLS), and Internet Protocol Security (IPSec).

Smart documentation system 120 can run on one or more servers and can arrange user interfaces, add entries, determine keywords, receive searches, determine entries based on the searches, display search results, store profiles and/or policies in data stores 125 and 130, and/or perform other activities. In some embodiments, smart documentation system 120 includes various data processing and analytic tools that allow it to determine which keywords to associate to an entry. In some embodiments, smart documentation system 120 is a server.

Smart documentation system 120 may be communicably coupled with data stores 125 and 130 and computing devices 110A-110M, and may communicate, access, or receive data (e.g., device information, authentication information) from third party 135, computing devices 110A-110M, and data stores 125 and 130. Smart documentation system 120 can be associated with a membership organization (e.g., a financial institution or an insurance company), and the entries can relate to insurance claims.

Data stores 125 and 130 can manage storage and access to entries, documents, user data, user profiles, documents, and other information. Data stores 125 and 130 may be data repositories of a set of integrated objects that are modeled using classes defined in database schemas. Smart documentation system 120 and/or other servers may collect and/or access data from data stores 125 and 130. Data stores 125 and 130 may further include flat files that can store data. In some embodiments, there are numerous data stores such as data stores 125 and 130 and in other embodiments, only one data store exists.

Figure 2:
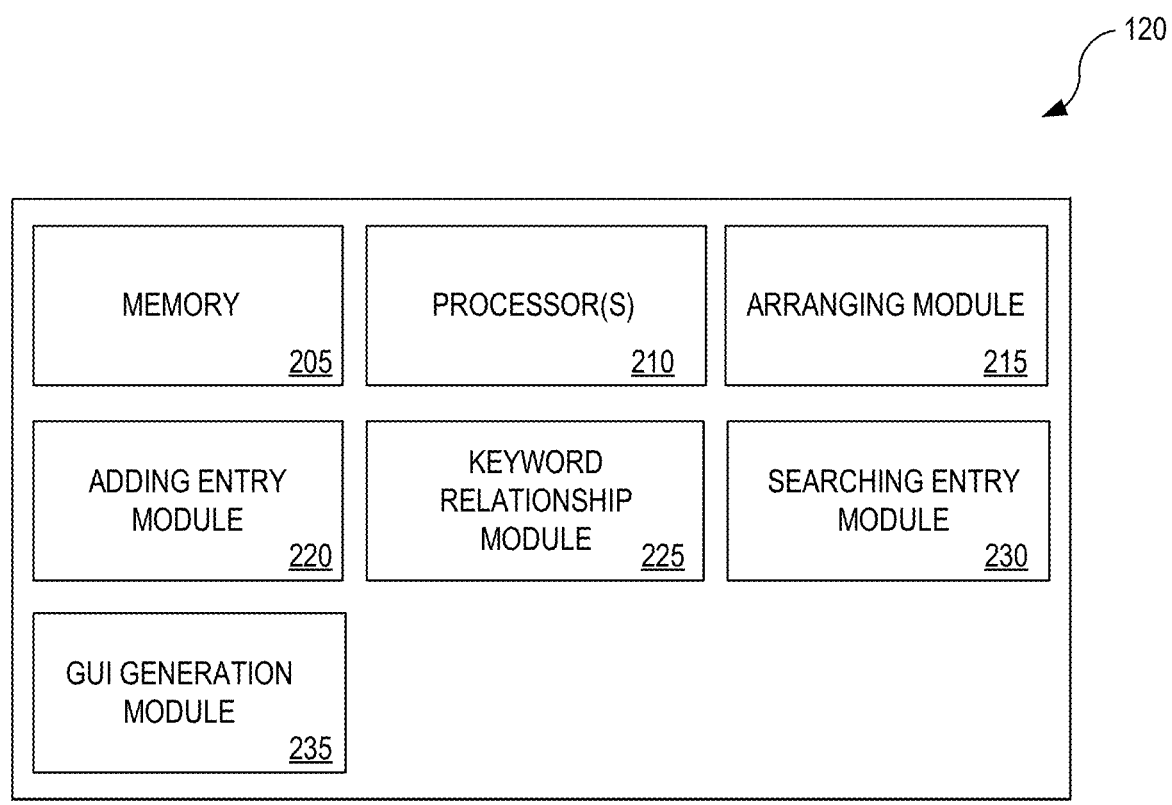
FIG. 2 illustrates various components of an smart documentation system that may be used in accordance with various embodiments of the present disclosure.

FIG. 2 illustrates a set of components within smart documentation system 120 according to one or more embodiments of the present disclosure. According to the embodiments shown in FIG. 2, smart documentation system 120 can include memory 205, one or more processors 210, arranging module 215, adding entry module 220, keyword relationship module 225, searching entry module 230, and graphical user interface ("GUI") generation module 235. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can be any device, mechanism, or populated data structure used for storing information. In accordance with some embodiments of the present disclosure, memory 205 can encompass, but is not limited to, any type of volatile memory, nonvolatile memory, or dynamic memory. For example, memory 205 can be random-access memory (RAM), memory storage devices, optical memory devices, magnetic media, floppy disks, magnetic tapes, hard drives, single inline memory modules (SIMMs), synchronous dynamic random-access memory (SDRAM), dual inline memory modules (DIMMs), Rambus dynamic random-access memory (RDRAM), double data rate random-access memory (DDR RAM), small outline dual inline memory modules (SODIMMs), EPROM, EEPROM, compact discs, DVDs, and/or the like. In accordance with some embodiments, memory 205 may include one or more disk drives or flash drives; one or more databases; one or more tables; or one or more files, local cache memories, processor cache memories, relational databases, flat databases; and/or the like. In addition, those of ordinary skill in the art will appreciate many additional devices and techniques for storing information that can be used as memory 305.

Memory 205 may store instructions for running one or more applications or modules on processor(s) 210. For example, memory 205 could be used in one or more embodiments to house all or some of the instructions needed to execute the functionality of arranging module 215, adding entry module 220, keyword relationship module 225, searching entry module 230, and GUI generation module 235.

Arranging module 215 can arrange a graphical user interface with a various portions (e.g., windows). In some embodiments, the first portion can have a set of entries and a second portion can have capability to add an entry to the set of entries, to search the set of entries, to capture user preferences, among other capabilities. Entries can include any type of documentation including manually entered entries (e.g., representative speaks on phone with member and documents the conversation), system generated entries (e.g., a system generated letter is sent to the user and documented in the system), and communications received from third parties (e.g., a user sends an email regarding a claim).

Figure 4:
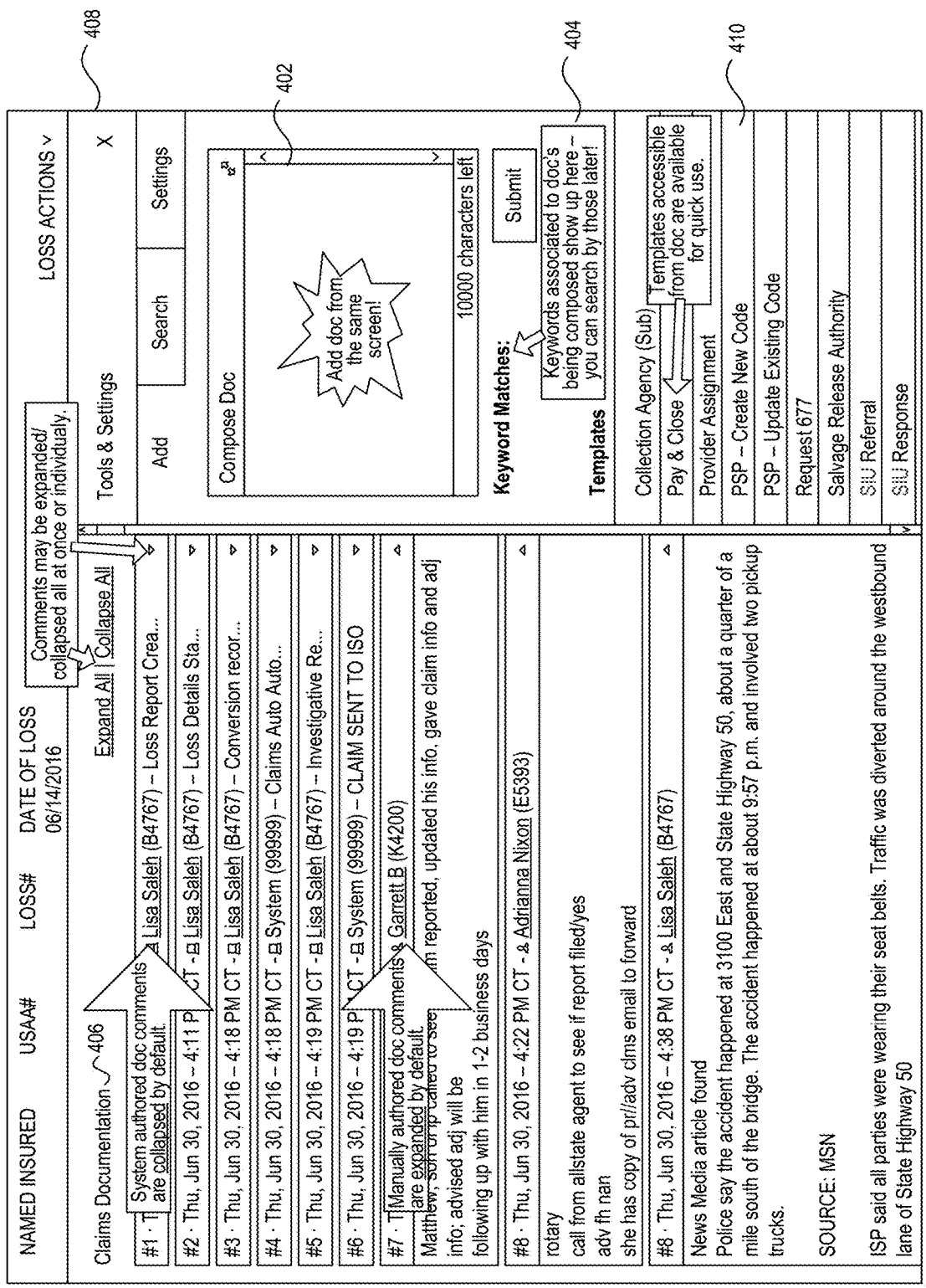
FIG. 4 is an example of a user interface that allows a user to add entries in accordance with various embodiments of the present disclosure.

The first portion can be placed on the left side of the graphical user interface such as in FIG. 4, element 406. The entries can be displayed using preferences and/or defaults such as collapsing system generated claims and expanding manually generated claims, ordering by time, author, operating function of operator (e.g., representative, manager), type of communication (e.g., voicemail, letter, notes), type of entry (e.g., system generated claim, manually generated claim, third party communication), among other preferences and/or defaults.

Figure 5:
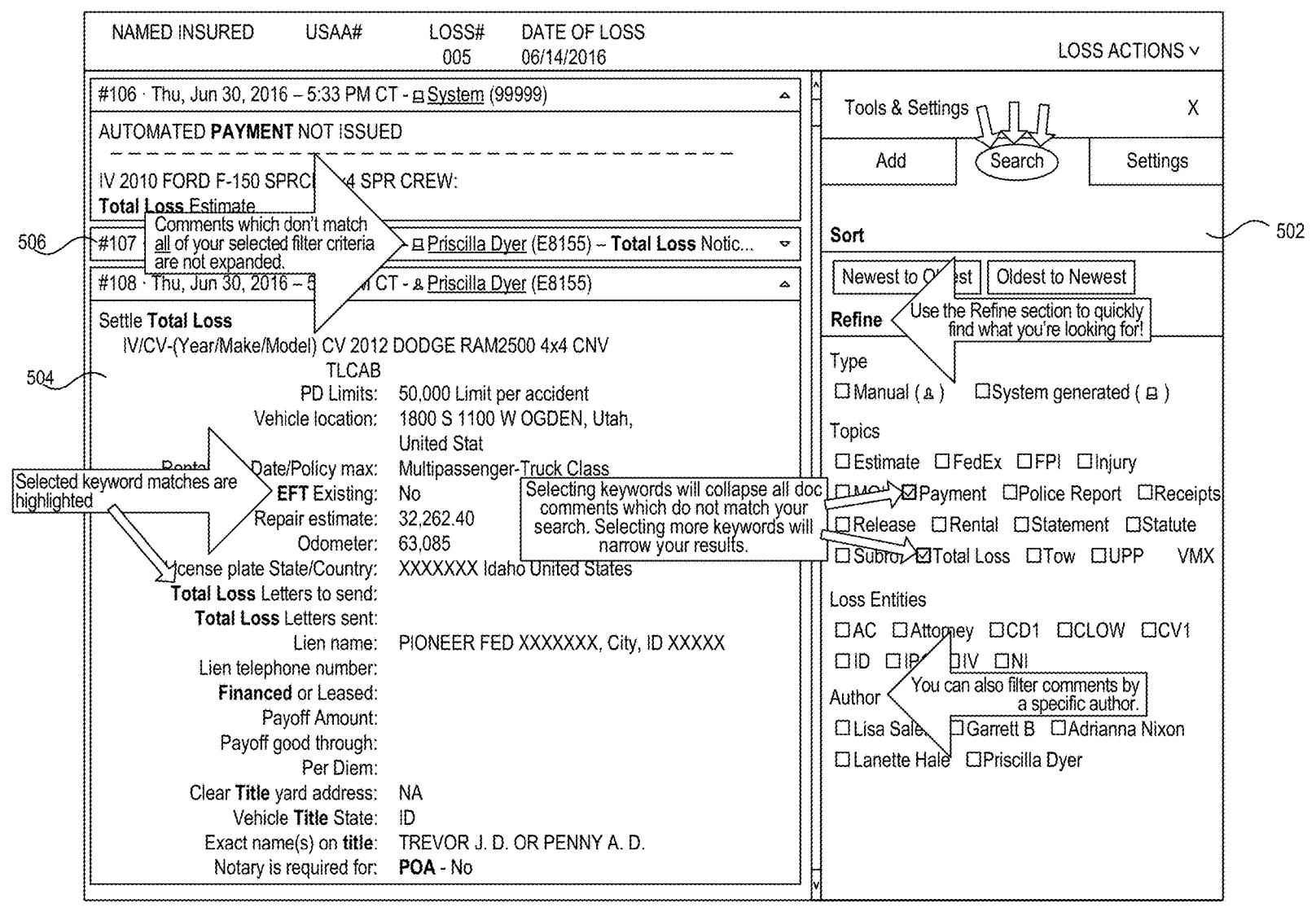

The second portion can be placed on the right side of the graphical user interface such as in FIG. 4, element 408. The second portion can include tabs such as tab to add an entry, a tab to search entries, and a settings tab. Each tab can have sub portions. For example, the tab to add an entry can include a first sub portion for a user to input the entry, a second sub portion for the system to show keyword matches to the entry being input by the user, and a third sub portion with templates the user can choose from to create the entry. The search tab can have various filters available to search the entries such as type of documentation (e.g., manual or system generated), topic (e.g., estimates, delivery, injury, receipts), entities, and author, as shown in FIG. 5, element 502. The settings tab can include user preferences, as shown in FIG. 6.

Adding entry module 220 can receive a request to add an entry to the set of entries. In some embodiments, the request can be received via the second portion of the graphical user interface as shown in FIG. 4, element 402. The entry can include one or more acronyms, words, or phrases (e.g., "call from agent regarding pr//adv clms"). As the user composes or creates the entry, adding entry module 220 dynamically determines one or more keywords related to the entry. In some embodiments, the keywords that will be associated with the entry can appear below where the entry is being input (e.g., FIG. 4, element 404). In this way, the user can see what keywords will be associated with the entry as the user is inputting the entry. Once the user is done composing the entry and indicates that the entry should be added to the set of entries (e.g., selects "submit"), the entry is added to the set of entries. To create the entry and/or other documentation, the user can select a template, such as FIG. 4, element 410. In some embodiments, the user selects a template and completes the template to the extent possible but cannot complete the entire template. In such circumstances, only the portions of the template that have been completed (or include at least some text) are saved in the entry, as opposed to saving the entire template, regardless of whether a portion of the template has been modified or completed. Thus, saving only the completed portions of the template saves memory without sacrificing information.

Keyword relationship module 225 can determine keywords that will be associated with the entry as the entry is being created. The keywords can be displayed in real-time below where the user is composing the entry (404). The relationships can be defined, for example, in a database as shown in FIGS. 7A-7B. For example, if the user inputs "arbitration," "arb," or "arbiter," the keyword "arbitration" will appear in the keyword portion. In this way, the user can know, in real time, what searches will bring up the entry. This also allows the user to use shorthand in creating entries by providing assurances that the entry will appear in searches. Once the entry is added to the set of entries (e.g., when the user selects "submit"), the keyword(s) can be associated with the entry. For example, if a search for entries related to "arbitration" would trigger the entry. In some embodiments, the user can create new keywords.

Searching entry module 230 receives a search request from a user. The user can search a set of entries using various filters such as keywords/topics, entity, type of entry (e.g., manual, system created) and type of documentation (e.g., voicemail), and the user can select more than one of each. The user can further select whether the results should be time/date-ordered, the types of entries that should be displayed, and other preferences. After the user selects the filters, the resulting entries can be displayed on the first portion of the graphical user interface, allowing the user to see the search criteria and the search results.

In some embodiments, when the user has selected more than one keyword, the search results can include entries that include all of the keywords or filters (i.e., primary entries) and entries that include fewer than all of the keywords or filters (i.e., secondary entries). In some embodiments, the primary entries are displayed in an expanded view (e.g., FIG. 5, element 504) whereas the secondary entries are displayed in a collapsed view (e.g., FIG. 5, element 506). Displaying results in this manner provides improvements over previous systems by indicating the most relevant entries but providing additional relevant results so the user does not miss critical entries.

GUI generation module 235 can generate one or more GUI screens that allow interaction with a user. In at least one embodiment, GUI generation module 240 generates a graphical user interface receiving information from and/or conveying information to the user. For example, GUI generation module 240 can display the arranged user interface, filtered sets of entries, the keywords, and preferences.

Figure 3:
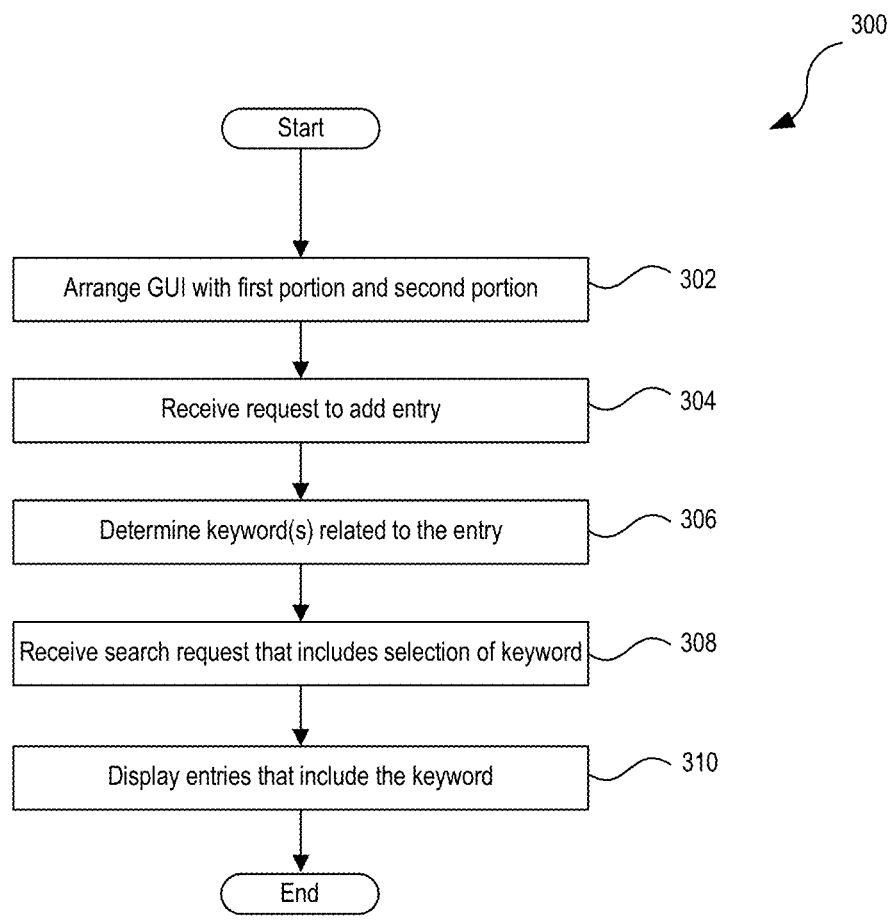
FIG. 3 is a flowchart illustrating a set of operations for adding and searching for entries in a smart documentation system in accordance with various embodiments of the present disclosure.

FIG. 3 is a flowchart illustrating sets of operations 300 for adding and searching for entries in a smart documentation system. In some embodiments, fewer than all of the operations in each set of operations are performed, whereas in other embodiments, additional operations are performed. Moreover, in some embodiments, the operations may be performed in different orders or in parallel. The operations can be performed by various components of smart documentation system 120 illustrated in FIG. 3.

Arranging operation 302 arranges a graphical user interface with a first portion and a second portion. The first portion can list the entries and the second portion can provide capability for the user to add entries or search the entries in the first portion. Receiving operation 304 can receive a request to add an entry. The request can be received via the second portion of the graphical user interface. Determining operation 306 determines the keyword(s) that relate the entry as the entry is being created. Such keywords can be displayed on the second portion so the user can see what keywords will trigger the entry when entries are being searched. Receiving operation 308 receives a search request that includes a selection of one or more keywords. Entries triggered by the keyword are displayed in the first portion, according to displaying operation 310.

Computer System Overview

Figure 8:
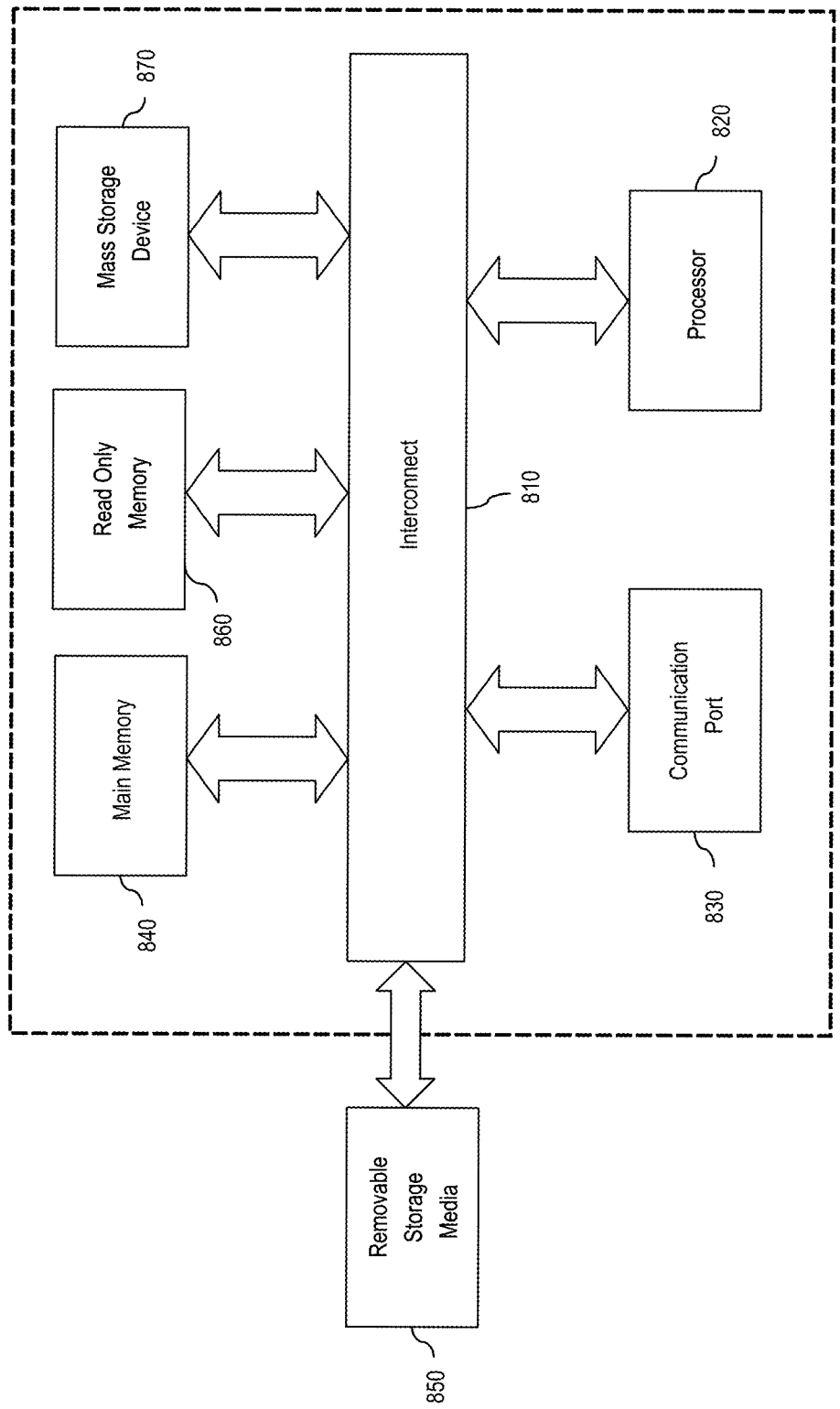
FIG. 8 illustrates an example of a computer system with which some embodiments of the present disclosure can be used.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present disclosure may be utilized. According to the present example, the computer system 800 includes an interconnect 810, at least one processor 820, at least one communication port 830, a main memory 840, a removable storage media 850, a read-only memory 860, and a mass storage device 870.

Processor(s) 820 can be any known processor, such as, but not limited to, an Intel® Itanium® or Itanium 2® processor(s), or AMD® Opteron® or Athlon MP® processor(s), or Motorola® lines of processors. Communication port(s) 830 can be a RS-232 port for use with a modem-based dial-up connection, a 10/100 Ethernet port, or a Gigabit port using copper or fiber. Communication port(s) 830 may be chosen depending on the type of network such as a Local Area Network (LAN), Wide Area Network (WAN), or any network to which the computer system 800 connects.

Main memory 840 can be random access memory (RAM) or any other dynamic storage device(s) commonly known in the art. Read-only memory 860 can be any static storage device(s) such as programmable read-only memory (PROM) chips for storing static information, such as instructions for processor(s) 820.

Mass storage device 870 can store information and instructions. Mass storage devices that may be used include hard disks such as the Adaptec® family of SCSI (small computer system interface) drives, optical discs, an array of discs such as RAID (redundant array of independent disks), the Adaptec® family of RAID drives, or any other mass storage device.

Interconnect 810 communicatively couples processor(s) 820 with the other memory, storage, and communication blocks. Depending on the storage devices used, interconnect 810 can be a PCI/PCI-X- or SCSI-based system bus.

Removable storage media 850 can be any type of external hard drive, floppy drive, IOMEGA® Zip Drives, compact disc read-only memory (CD-ROM), compact disc re-writable (CD-RW), and/or digital video disc read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed there between, while not sharing any physical connection with one another. Based on the disclosure provided herein, one of ordinary skill in the art will appreciate a variety of ways in which a connection or a coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" encompasses being completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules; or a module can include one or more application programs.

The term "network" generally refers to a group of interconnected devices capable of exchanging information. A network may be as small as several personal computers on a local area network (LAN) or as large as the Internet, a worldwide network of computers. As used herein, "network" is intended to encompass any network capable of transmitting information from one entity to another. In some cases, a network may comprise multiple networks—even multiple heterogeneous networks—such as one or more border networks, voice networks, broadband networks, financial networks, service provider networks, Internet service provider (ISP) networks, and/or public switched telephone networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. More importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead, are meant to be examples. Other systems, devices, and networks to which embodiments of the present disclosure are applicable include, but are not limited to, other types of communication and computer devices and systems. More specifically, embodiments are applicable to communication systems, services, and devices, such as cell phone networks and compatible devices. In addition, embodiments are applicable to all levels of computing, from the personal computer to large network mainframes and servers.

In conclusion, the present disclosure discloses novel systems, methods, and arrangements for smart documentation. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments with different combinations of features and embodiments that do not include all of the described features. Accordingly, the scope of the present disclosure is intended to embrace all such alternatives, modifications, and variations that fall within the scope of the claims, together with all equivalents thereof. Therefore, the above description should not be taken as limiting.

What is claimed is:

1. A computing device comprising a display screen, the computing device being configured to:
   display, on the display screen, a first window listing a set of entries; and
   display, on the display screen, a second window that can add entries directly into the set of entries and that can search for entries having selected features within the set of entries,
   wherein the first window and the second window are displayed simultaneously,
   wherein the second window dynamically displays one or more keywords related to the entry as an entry is being created, the one or more keywords being associated with the entry as the entry is added to the set of entries, and
   wherein the second window receives a search request with the one or more keywords and in response, causes the entries associated with the one or more keywords to be displayed in the first window.

2. A smart documentation system, comprising:
   one or more processors; and
   a computer readable storage medium having instructions stored thereon, which when executed by the one or more processors cause the smart documentation system to:
   display, on a display screen, a first window listing a set of entries;
   display, on the display screen, a second window for adding entries directly into the set of entries and for searching for entries having selected features within the set of entries,
      wherein the first window and the second window are displayed simultaneously;
   receive, in the second window, a request to add an entry to the set of entries, the entry to be displayed in the first window;
   determine a keyword related to the entry as the entry is being created, wherein the keyword is dynamically displayed in the second window as the entry is being created;
   associate the keyword with the entry as the entry is added to the set of entries;
   after the entry has been added to the set of entries, receive, in the second window, a search request for entries associated with the keyword; and
   in response to the search request, display, in the first window, the entries associated with the keyword.

3. The smart documentation system of claim 2, wherein the instructions, when executed by the one or more processors, further cause the smart documentation system to determine one or more additional keywords related to the entry and to associate the one or more additional keywords with the entry, wherein the entries displayed in response to the search request include primary entries comprising content that matches both the keyword and the one or more additional keywords, wherein the primary entries are displayed in an expanded view.

4. The smart documentation system of claim 3, wherein the entries displayed in response to the search request include secondary entries, wherein the secondary entries comprise content that matches only one of the keyword or the one or more additional keywords, wherein the secondary entries are displayed in a collapsed view.

5. The smart documentation system of claim 2, wherein the set of entries includes system created comments and manually created comments, wherein the instructions, when executed by the one or more processors, further cause the smart documentation system to display, in the first window, the system created comments in a collapsed view and the manually created comments in an expanded view as a default.

6. The smart documentation system of claim 2, wherein the search request includes a selection of entities, an author, and a type of entry.

7. The smart documentation system of claim 2, wherein the set of entries includes system-created comments, manually-created comments, and customer-created comments.

8. The smart documentation system of claim 2, wherein the instructions, that when executed by the one or more processors, cause the smart documentation system to receive, in the second window, the request to add the entry to the set of entries, further cause the smart documentation system to:
   receive a selection of a template;
   receive information into at least a portion of the template;
   save the portion of the template with the information; and
   discard a remainder of the template before saving the template into the entry.

9. The smart documentation system of claim 2, wherein the instructions, when executed by the one or more processors, further cause the smart documentation system to resize the first window and the second window based on a screen size of a device used to view the first window and the second window.

10. The smart documentation system of claim 2, where in the set of entries relate to a single insurance claim by an insured person.

11. A method comprising:
   arranging a graphical user interface of a computing device with a first portion having a set of entries and a second portion having capability to add an entry to the set of entries and to search for entries with selected features, wherein the first portion and the second portion are displayed simultaneously;
   receiving, on the second portion of the graphical user interface, a request to add an entry to the set of entries, wherein the entry includes one or more acronyms, words, or phrases;
   dynamically determining a keyword related to the entry as the entry is being added;
   receiving, on the second portion of the graphical user interface, a search request that includes a selection of the keyword; and
   displaying, on the first portion of the graphical user interface, entries in the set of entries that include the keyword.

12. The method of claim 11, further comprising displaying, on the second portion of the graphical user interface as the entry is being added, the keyword.

13. The method of claim 11, wherein the search request includes one or more additional keywords, wherein displaying, on the first portion of the graphical user interface, the entries includes displaying the entries that include content that matches both the keyword and the one or more additional keywords in an expanded view.

14. The method of claim 13, wherein displaying, on the first portion of the graphical user interface, the entries includes displaying the entries that include content that matches only either the keyword of the one or more additional keywords in a collapsed view.

15. The method of claim 11, wherein the set of entries includes system-created comments and manually-created comments, wherein arranging the graphical user interface further includes displaying the system-created comments in a collapsed view and displaying the manually-created comments in an expanded view as a default.

16. The method of claim 11, wherein receiving, on the second portion of the graphical user interface, the search request further includes receiving a selection of entities, author, and type of entry.

17. The method of claim 11, wherein the set of entries includes system-created comments, manually-created comments, and customer-created comments.

18. The method of claim 11, wherein the request to add the entry to the set of entries includes:
   receiving a selection of a template;
   receiving information into at least a portion of the template;
   saving only the portion of the template with the information; and
   discarding a remainder of the template before saving the template into the entry.

19. The method of claim 11, wherein the first portion and the second portion are resized based on a screen size of a device used to view the first portion and the second portion.

20. The method of claim 11, where in the set of entries relate to a single insurance claim by an insured person.

* * * * *